United States Patent
Wu et al.

(10) Patent No.: US 6,418,166 B1
(45) Date of Patent: Jul. 9, 2002

(54) MOTION ESTIMATION AND BLOCK MATCHING PATTERN

(75) Inventors: Shou-jen Joseph Wu; Chih-Lung Bruce Lin, both of Redmond; Ming-Chieh Lee, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,279

(22) Filed: Nov. 30, 1998

(51) Int. Cl.$^7$ ................................................. H04N 7/12
(52) U.S. Cl. ................................................. 375/240.12
(58) Field of Search ............................ 348/206, 394.1, 348/402.1, 407.1, 409.1, 413.1, 415.1, 416.1, 425, 699, 700; 375/240.01, 240.12, 240.16, 240.27; H04N 7/12

(56) References Cited

U.S. PATENT DOCUMENTS

| | | | |
|---|---|---|---|
| 5,049,991 A | 9/1991 | Niihara | |
| 5,379,351 A | 1/1995 | Fandrianto et al. | |

(List continued on next page.)

FOREIGN PATENT DOCUMENTS

| | | | |
|---|---|---|---|
| EP | 0535746 A2 | 4/1993 | |
| EP | 0825778 A2 | 2/1998 | |

OTHER PUBLICATIONS

"Video Coding for Low Bitrate Communication," Draft Recommendation H.263, International Telecommunication Union, Dec. 1995, 51 pages.

ISO/IEC FCD 14496-2: Information technology—Very-low bitrate audio-visual coding—Part 2: visual [SC 29/WG 11 N 2202], ISO/IEC JTC 1/SC 29/WG 11, May 28, 1998.

Yu et al., "Two-Dimensional Motion Vector Coding for Low Bitrate Videophone Applications," Proc. Int'l Conf. on Image Processing, Los Alamitos, US, pp. 414–417, IEEE Comp. Soc. Press (1995).

(List continued on next page.)

Primary Examiner—Nhon Diep
(74) Attorney, Agent, or Firm—Klarquist Sparkman, LLP

(57) ABSTRACT

A motion estimation process improves coding efficiency by using a modified search criteria. The modified search criteria takes into account the error signal needed to encode a block of pixels as well as the the motion data when selecting a matching block in a target frame. This approach reduces the combined overhead of both the motion and error signal data for the encoded block of pixels. When used in conjunction with a spiral search path in the target frame, the modified search criteria improves the speed of the search because it eliminates the need for an exhaustive search. A predicted motion vector is used to optimize the search location. Preferably the search order is selected so that target pixels closer to predicted point are searched before pixels farther away in the target frame.

33 Claims, 5 Drawing Sheets

U.S. PATENT DOCUMENTS

| | | | |
|---|---|---|---|
| 5,428,396 A | | 6/1995 | Yagasaki et al. |
| 5,428,403 A | * | 6/1995 | Andrew et al. ............. 348/699 |
| 5,592,226 A | | 1/1997 | Lee et al. |
| 5,598,216 A | * | 1/1997 | Lee ........................ 375/240.16 |
| 5,684,538 A | * | 11/1997 | Nakaya et al. ......... 375/240.17 |
| 5,764,805 A | | 6/1998 | Martucci et al. |
| 5,768,537 A | * | 6/1998 | Butter et al. ................ 709/247 |
| 5,847,776 A | | 12/1998 | Khmelnitsky et al. |
| 6,011,596 A | | 1/2000 | Burl et al. |
| 6,052,150 A | | 4/2000 | Kikuchi |
| 6,195,389 B1 | * | 2/2001 | Rodriguez et al. ..... 375/240.16 |
| 6,198,849 B1 | * | 3/2001 | Fischer et al. .............. 382/232 |

OTHER PUBLICATIONS

IBM Technical Disclosure Bulletin, "Advanced Motion Estimation for Moving Picture Expert Group Encoders," vol. 39, No. 04, pp. 323–324 (Apr. 1996).

ISO, ISO/IEC JTC1/SC29/WG11 MPEG 97/N1642, "MPEG–4 Video Verfication Model Version 7.0, 3. Encoder Definition," pp. 1, 17–122, Bristol (Apr. 1997).

Wiegand et al., "Motion–Compensating Long–Term Memory Prediction," Proc. ICIP, Santa Barbara, CA, Oct. 1997, vol. 2, pp. 53–56 (1997).

Wiegand et al., "Block–Based Hybrid Coding Using Motion Compensated Long–Term Memory Prediction," Picture Coding Symposium, Berlin Germany, Sep. 1997, No. 143, pp. 153–158 (1997).

Wiegand et al., "Fast Search for Long–Term Memory Motion–Compensated Prediction," Proc. ICIP, Chicago, IL, Oct. 1998, vol. 3, pp. 619–622 (1998).

* cited by examiner

SOURCE FRAME     TARGET FRAME

EXPANDED SEARCH AREA

MOTION ESTIMATION AND BLOCK MATCHING PATTERN

FIELD OF THE INVENTION

The invention relates to video coding, and specifically, to an improved method for performing motion estimation in video coding applications.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1–2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block $M_N$ in an image frame N, a search is performed across the image of a next successive video frame N+1 or immediately preceding image frame N−1 (i.e., bi-directionally) to identify the most similar respective blocks MN+1 or $M_{N-1}$. The location of the most similar block relative to the block $M_N$ is encoded with a motion vector (DX,DY). The motion vector is then used to compute a block of predicted sample values. These predicted sample values are compared with block $M_N$ to determine the block error signal. The error signal is compressed using a texture coding method such as discrete cosine transform (DCT) encoding.

Object-based video coding techniques have been proposed as an improvement to the conventional frame-based coding standards. In object-based coding, arbitrary shaped image features are separated from the frames in the video sequence using a method called "segmentation." The video objects or "segments" are coded independently. Object-based coding can improve the compression rate because it increases the interframe correlation between video objects in successive frames. It is also advantageous for variety of applications that require access to and tracking of objects in a video sequence.

In the object-based video coding methods proposed for the MPEG-4 standard, the shape, motion and texture of video objects are coded independently. The shape of an object is represented by a binary or alpha mask that defines the boundary of the arbitrary shaped object in a video frame. The motion of an object is similar to the motion data of MPEG-2, except that it applies to an arbitrary-shaped image of the object that has been segmented from a rectangular frame. Motion estimation and compensation is performed on blocks of a "video object plane" rather than the entire frame. The video object plane is the name for the shaped image of an object in a single frame.

The texture of a video object is the image sample information in a video object plane that falls within the object's shape. Texture coding of an object's image samples and error signals is performed using similar texture coding methods as in frame-based coding. For example, a segment-edimage can be fitted into a bounding rectangle formed of macroblocks. The rectangular image formed by the bounding rectangle can be compressed just like a rectangular frame, except that transparent macroblocks need not be coded. Partially transparent blocks are coded after filling in the portions of the block that fall outside the object's shape boundary with sample values in a technique called "padding."

In both frame-based and object-based video coding, the process of motion estimation is one of the most important parts of the coding system in terms of both the speed of the encoding process as well as the quality of the video. Both the H263 and MPEG-4 coding standards perform motion estimation on macroblocks. The goal of the motion estimation process is to find the macroblock in a reference picture that results in the smallest error signal after motion compensation. By minimizing the error signal, the encoder attempts to minimize the number of bits needed to code the macroblock. However, in addition to coding the error signal, the encoder must also code the macroblock header and motion vectors. While minimizing the error signal may minimize the number of bits needed to encode the error signal, it does not necessarily result in the most efficient coding of the overall macroblock.

SUMMARY

The invention provides an improved method for performing motion estimation. One aspect of the invention is a method for performing motion estimation that improves the coding efficiency by using a measure of the combined motion and error data to select the motion parameters for a block (e.g., the motion vector). This modified search criteria takes into account the overhead associated with coding the motion parameters for a block as well as the error signal.

An encoder implementation uses the measure of the combined motion and error signal data as the search criteria for finding a matching block of pixels in the motion estimation process. Using a block matching scheme, the encoder searches for a matching block in a target frame for a source block in a source frame. The objective of the search is to find a block of pixels in the target frame that minimizes the combined motion and error signal coding overhead for the source block. By using this modified search criteria, the encoder can achieve better coding efficiency.

Another aspect of the invention is a method for performing pixel block matching that improves encoding speed by selecting a more efficient search path for the matching process. In particular, this method arranges the search order used in the block matching process so that pixels that are closer to a desired starting point (e.g., a predicted point) are searched first before pixels located farther from the desired starting point.

An implementation designed for the MPEG-4 coding standard uses this approach to shift the search order of blocks in a target frame so that blocks closer to a desired starting point are searched first. In the coding standards like MPEG-4, the need arises to optimize the search path because they have restrictions that limit the motion vector size, which in turn, leads to a less than optimal search starting point. The starting point of the search is not optimal because it is derived from motion vectors that are limited in size. Shifting the search order corrects for the less than optimal starting point.

Finally, another aspect of the invention is a method for block matching that uses a search path and search criteria that reduces the amount of searching needed to compute the motion parameters for a block of pixels. An implementation of this method uses the modified search criteria outlined above along with a spiral search path. Based on the attributes of the modified search criteria, the encoder can determine whether it has found a target block that minimizes the modified search criteria without searching all target blocks in the search area. Thus, this approach improves the performance of the encoder by speeding up the search in the block matching process.

Further advantages and features will be apparent from the following detailed description and accompanying drawings.

DETAILED DESCRIPTION

Introduction

The first section below provides a description of a video encoder and decoder. Subsequent sections describe an implementation of the invention in an encoder. The encoder implementation is specifically designed for coding blocks of pixels (e.g., macroblocks as defined in video coding standards MPEG 4 and H263). Each of the macroblocks for predicted frames includes header parameters, a motion vector, and a texture coded error signal. The encoder implementation improves coding efficiency by using a measure of the combined motion and error data when searching for a matching block in the block matching process. Since this approach takes into account a more complete picture of the coding overhead associated with selecting a particular motion vector, it improves coding efficiency. The encoder implementation is also faster because it uses an improved search pattern and reduces the searching needed to find the motion vector.

The invention, as well as the specific encoder implementation described below, apply to both frame-based and object-based video coding. Since an object based encoder and decoder encompass all of the features of a frame based encoder and decoder, the following discussion provides a good foundation for implementing the invention in either frame based or object based coding applications.

Description of an Example Encoder and Decoder

Figure 1:
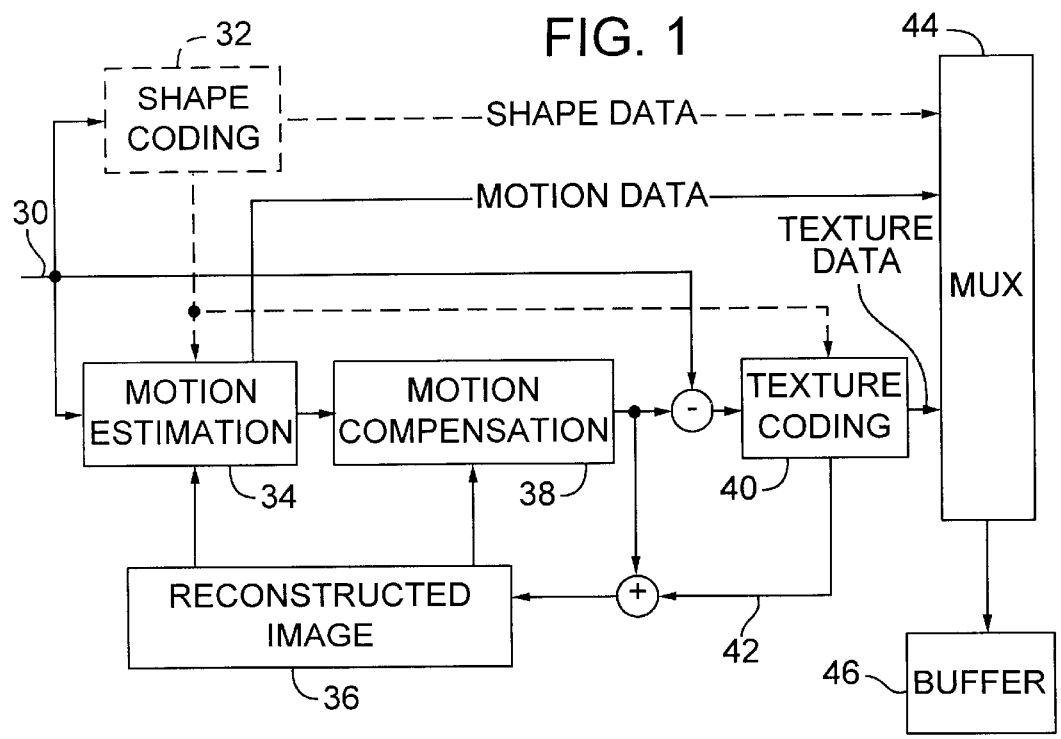
FIG. 1 is a block diagram of a video encoder.

FIG. 1 is a block diagram illustrating an implementation of an object-based video encoder. The input 30 to the encoder includes images representing the video objects in each frame, the shape of each video object and bounding rectangles. The shape information is available before the encoder codes texture or motion data. Frame-based coding differs in that the entire frame is coded without shape information, and the input 30 consists of a series of image frames.

The shape coding module 32 reads the definition of an object including its bounding rectangle and extends the bounding rectangle to integer multiples of macroblocks. The shape information for an object comprises a mask or "alpha plane." The shape coding module 32 reads this mask and compresses it, using for example, a conventional chain coding method to encode the contour of the object.

Motion estimation module 34 reads an object including its bounding rectangle and a previously reconstructed image 36 and computes motion estimation data used to predict the motion of an object from one frame to another. The motion estimation module 34 searches for the most similar macroblock in the reconstructed image for each macroblock in the current image to compute a motion vector for each macroblock. The specific format of the motion vector from the motion estimation module 34 can vary depending on the motion estimation method used. In the implementation described below, there is a motion vector for each macroblock, which is consistent with current MPEG and H26X formats.

The motion compensation module 38 reads the motion vectors computed by the motion estimation module and the previously reconstructed image 36 and computes a predicted image for the current frame. Each pixel in the predicted image is constructed by using the motion vector for the macroblock that it resides in to find the corresponding pixel in the previously reconstructed image 36. The encoder then finds the difference between the image sample values in the input image block as specified in the input 30 and the corresponding sample values in the predicted image block as computed in the motion compensation module 38 to determine the error signal for the macroblock.

Texture coding module 40 compresses this error signal for inter-frame coded objects and compresses image sample values for the object from the input data stream 30 for intra-frame coded objects. The feedback path 42 from the texture coding module 40 represents the error signal. The encoder uses the error signal blocks along with the predicted image blocks from the motion compensation module to compute the previously reconstructed image 36.

The texture coding module 40 codes intra-frame and error signal data for an object using any of a variety of still image compression techniques. Example compression techniques include DCT, wavelet, as well as other conventional image compression methods.

The bit stream of the compressed video sequence includes the shape, motion and texture coded information from the shape coding, motion estimation, and texture coding modules. Multiplexer 44 combines and formats this data into the proper syntax and outputs it to the buffer 46.

While the encoder can be implemented in hardware or software, it is most likely implemented in software. In a software implementation, the modules in the encoder represent software instructions stored in memory of a computer and executed in the processor, and the video data stored in memory. A software encoder can be stored and distributed on a variety of conventional computer readable media. In hardware implementations, the encoder modules are implemented in digital logic, preferably in an integrated circuit. Some of the encoder functions can be optimized in special-purpose digital logic devices in a computer peripheral to off-load the processing burden from a host computer.

Figure 2:
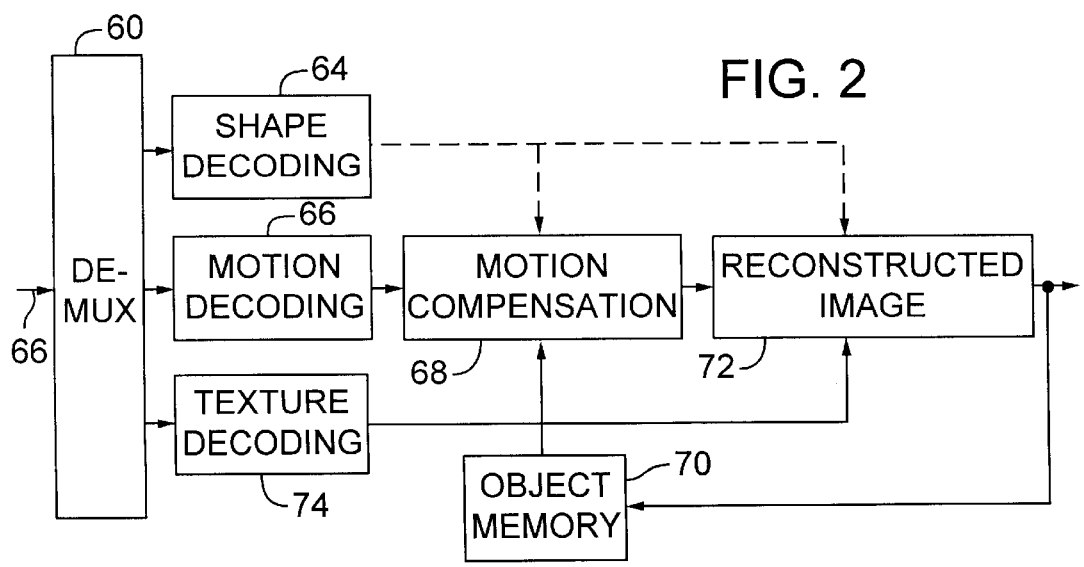
FIG. 2 is a block diagram of a video decoder.

FIG. 2 is a block diagram illustrating a decoder for an object-based video coding method. A demultiplexer 60 receives a bit stream representing a compressed video sequence and separates shapes, motion and texture encoded data on an object by object basis. The demultiplexer also includes a motion vector decoder that reconstructs the motion vector for each macroblock from a single variable length code.

Shape decoding module 64 decodes the shape or contour for the current object being processed. To accomplish this, it employs a shape decoder that implements the inverse of the shape encoding method used in the encoder of FIG. 1. The resulting shape data is a mask, such as a binary alpha plane or gray scale alpha plane representing the shape of the object.

The motion decoding module 66 decodes the motion information in the bit stream. The decoded motion information includes the motion vectors for each macroblock that are reconstructed from entropy codes in the incoming bit stream. The motion decoding module 66 provides this motion information to the motion compensation module 68, and the motion compensation module 68 uses the motion vectors to find predicted image samples in the previously reconstructed object data 70.

The texture decoding module 74 decodes error signals for inter-frame coded texture data and an array of color values for intra-frame texture data and passes this information to a module 72 for computing and accumulating the reconstructed image. For inter-frame coded objects, this module 72 applies the error signal data to the predicted image output from the motion compensation module to compute the reconstructed object for the current frame. For intra-frame coded objects the texture decoding module 74 decodes the image sample values for the object and places the reconstructed object in the reconstructed object module 72. Previously reconstructed objects are temporarily stored in object memory 70 and are used to construct the object for other frames.

Like the encoder, the decoder can be implemented in hardware, software or a combination of both. In software implementations, the modules in the decoder are software instructions stored in memory of a computer and executed by the processor, and video data stored in memory. A software decoder can be stored and distributed on a variety of conventional computer readable media. In hardware implementations, the decoder modules are implemented in digital logic, preferably in an integrated circuit. Some of the decoder functions can be optimized in special-purpose digital logic devices in a computer peripheral to off-load the processing burden from a host computer.

Improved Motion Estimation and Block Matching Pattern

Figure 3:
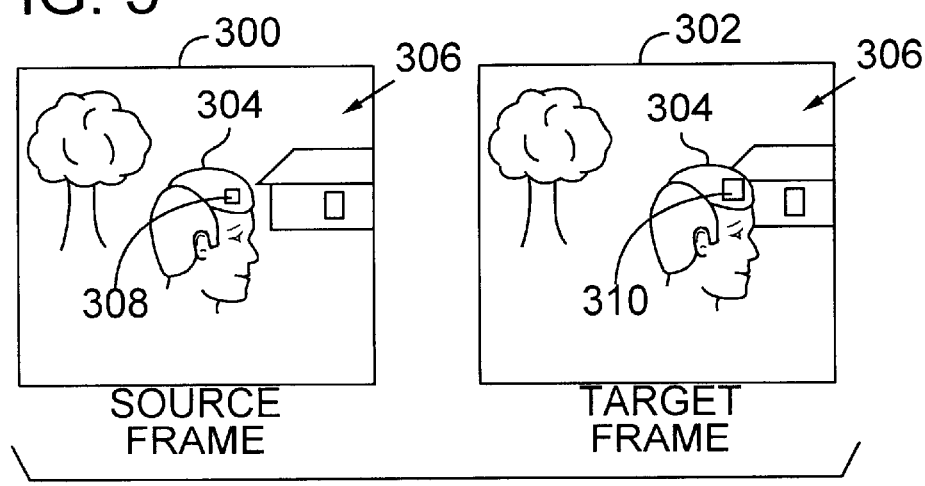
FIG. 3 is a diagram showing an example of a source and target frame to illustrate a motion estimation process used for video coding.

Before describing the encoder implementation in detail, it is helpful to begin with an example of the motion estimation process. FIG. 3 is an example of a source and target frame 300, 302 in a simple video sequence. Each frame includes a foreground object (moving head 304) and background objects 306 (e.g., a stationary house and tree in the background). The process of motion estimation approximates the motion of pixels in the source frame relative to the target frame. To accomplish this, the motion estimator in the encoder selects a source block of pixels 308 in the source frame and a search area 310 in the target frame. Following a search path in the target image, the motion estimator matches the pixel values in the source block with pixel values at corresponding locations of a region in the search area 310. At each step along the search path, the motion estimator computes an error signal, which is a measure of the difference between the pixel values in the source block and the pixel values at corresponding locations in the search area. This error signal is typically computed as the sum of absolute differences (SAD), but also may be computed as the sum of square differences. This process is often referred to as block matching because the search is looking for a block of pixels that most closely matches the source block.

After identifying matching blocks, the motion estimator approximates the motion of pixels in the source frame with motion parameters that define the motion between each source pixel and a corresponding pixel location in the target frame. The motion parameters may be encoded for each pixel or for blocks of pixels. In some cases, the motion parameters are the coefficients of a geometric transform (e.g., an affine or perspective transform) that describes the motion of a pixel or block of pixels from the source to the target frame. These coefficients can be encoded as a series of motion vectors that describe the motion of reference points for a block of pixels. The decoder then derives the motion coefficients from the reference points. An alternative approach is to select a single motion vector per block of pixels in the source frame that describes the translation motion of all pixels in the source block.

Both the encoder and decoder use the motion parameters in the same way to compute predicted pixels for each pixel in the source image. Since the predicted pixels do not perfectly match the source pixels, the motion compensation component of the encoder computes an error signal as the difference between the predicted pixels and the corresponding source pixels. Rather than code the actual pixel value for each pixel in the source frame, the encoder then encodes the motion parameters, the pixels in the target frame, and an error signal as computed in the motion compensation component.

The encoder implementation improves the coding efficiency and quality of the intercoded video images by using modified criteria for selecting a matching block of pixels in the target area. This modified criteria is a combined measure of the motion and error signal data for interframe blocks. The encoder implementation uses the same block size and block format as the MPEG-4 and H263 coding standards, so these blocks are referred to as macroblocks.

At a high level, the combined measure of the motion and error signal can be expressed as:

COMBINED_MEASURE=A*Bits(motion vector)+SD, where A is a parameter for adjusting the measure of the bits needed to code the motion vector (Bits), and SD is a sum of the differences. In the encoder implementation, SD is the sum of absolute differences. The parameter A addresses two issues. First, it includes a weighting component that is dependent on the quantization step used for the image being coded. Since the motion vector and error signal are expressed in different units, this weighting component makes an adjustment for the difference in units as a function of the quantization step. Second, the parameter A includes a constant that is calculated to reduce the number of bits for the video clip being coded. The constant is selected by experimenting with the video clip to find a value for the constant that minimizes the bits needed to code interframe macroblocks.

With the implementation details outlined above, the combined measure of motion and error signal data can be expressed as a modified Sum of absolute differences:

Modified SAD=K*Qs*Bits(motion vector)+SAD, where K is the constant optimized to reduce the interframe bits for the video clip, Qs is a per frame parameter that adjusts for the quantization step, Bits is a measure of the number of bits needed to encode the motion vector for the block of pixels in the source image frame being coded, and SAD is a sum of absolute differences between image samples of the source block and image sample values at corresponding locations in a target block. The motion vector defines the location of the target block relative to the source block.

Experiments show that the above-expression for the modified SAD reduces the coding overhead for interframe macroblocks relative to block matching based solely on SAD. In particular, the modified SAD achieves better performance for low motion video scenes (i.e., where SAD tends to be relatively small).

The new criteria for performing block matching is used to search for a matching block in the target area. The search begins at a starting location in the search area of the target frame, and then proceeds along a search path. At each step along the search path, the motion estimation module evaluates the combined measure of motion and error signal data. For simplicity, we refer to this quantity as the Combined Search Criteria (CSC). The objective of the search is to minimize the value of the CSC for target blocks of pixels located in the search area.

Figure 4:
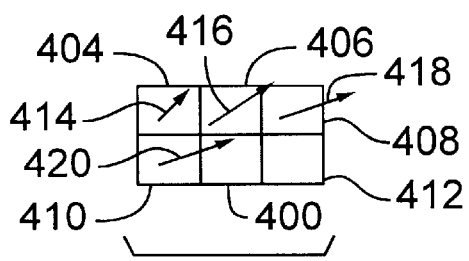
FIG. 4 is a diagram showing an example of macroblocks and the motion vectors associated with these blocks in a video frame to illustrate how to predict a motion vector for a macroblock.

Before beginning the search, the encoder selects a search starting location. Preferably, the starting location is selected based on the motion vector computed for neighboring blocks. Since the motion of neighboring blocks tends to be similar to the block of interest, a starting point based on the neighboring motion vectors is likely to begin the next search near the matching block in the search area. FIG. 4 is a diagram showing the current macroblock 400, surrounded by neighboring macroblocks 404–410 and their motion vectors 414–420. The motion estimation module computes a starting location by computing a predictor for the current block. The predictor is computed as the median of the X and Y motion vector components of the left block 40, above block 406, and above-right block 408. The median of the X components of these candidate blocks is the predictor for the X component, and the median of the Y component of these blocks is the predictor for the Y component.

Figure 5:
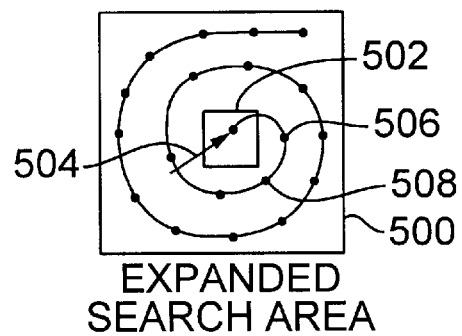
FIG. 5 is diagram of an expanded search area in a target frame, such as the one shown in FIG. 3, to illustrate a spiral search pattern used in block matching.

After computing the starting location, the motion estimation module steps along a search path and evaluates the CSC for target blocks located at steps along the path. In particular, the encoder implementation uses a spiral search path, where each search step moves further from the starting location. FIG. 5 illustrates an example of the spiral search path in an expanded version of the search area 500 shown in FIG. 3. The first target block 502 is approximately centered at the starting location, which is defined by the predictor motion vector 504. The dots (e.g., 506, 508) are examples of the steps along the spiral search path.

Figure 6:
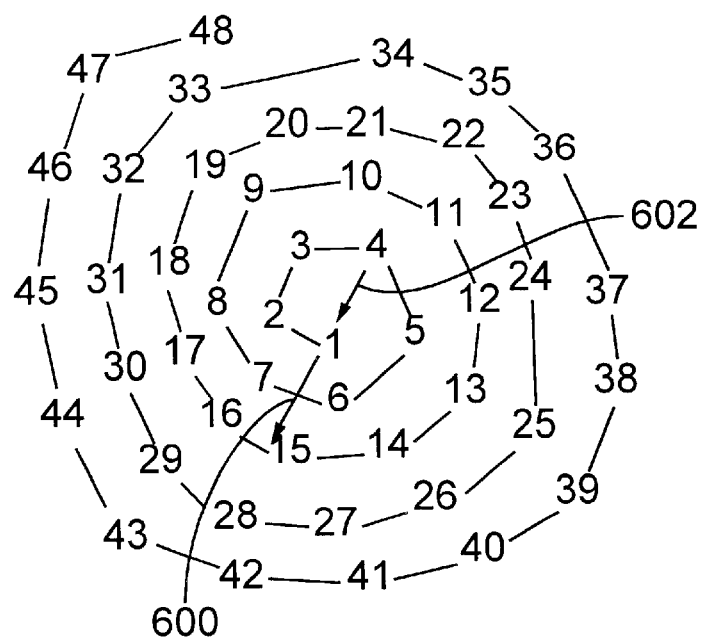
FIG. 6 is a diagram illustrating a spiral search pattern originating at a starting location that is shifted from a more optimal starting location.

FIG. 6 illustrates a more detailed example of the steps in the spiral search path in the encoder implementation. Each number corresponds to a step in the search path. The starting point of the search path, in most cases, is the location defined by the motion vector predictor.

Preferably, the steps in the spiral search should be ordered in increasing distances from the starting location. As explained further below, this ordering can optimize the search by allowing the block match process to identify a matching block without making an exhaustive search in the search area. The encoder implementation is designed to be compatible with the MPEG 4 coding standard. Because of the limitations placed on the size of motion vectors in MPEG 4, the motion vector predictor may not always represent a good starting point for the spiral search.

To illustrate this problem, consider the example shown in FIG. 6, where the dashed motion vector 600 represents the desired starting location for a search, and the solid motion vector 602 is the motion vector that results due to the limitation on motion vector size in the MPEG 4 standard. Rather than starting the search at the point indicated by the motion vector predictor 600, the search is forced to start at the point indicated by the limited motion vector 602.

One way to overcome this limitation is to sort the search order of locations in the target area by location from the desired starting point (e.g., the point of the motion vector predictor). This approach, however, increases the processing overhead for motion estimation.

Another approach, used in the encoder implementation, is to shuffle or shift the search order so that blocks that are more likely to be the closest match are searched first. In particular, the encoder shuffles the search order so that the target blocks closer to the predictor point are searched first.

This approach can be better understood by considering the example shown in FIG. 6. The original search order for the block matching process is {1, 2, 3, . . . , 48}.

The shifted search order is {15, 16, 17, 18, . . . , 48, 14, 13, 12, . . . , 1}

The implementation computes the shifted search order in two steps: first, it computes the distance between the desired spiral search center (i.e., the desired start point) and the predicted point, which is in a different location than the desired start point due to the limitations on motion vector size. Next, it looks up a new, pre-calculated starting point for this distance. This look up operation provides the new start index in the search order (e.g., 15 in the example above).

This adjustment of the search order is a special case where the desired starting point of the spiral search is different than the predicted point. The desired starting point is computed by finding the median of the X and Y components of neighboring motion vectors as explained above, without any limitation on the motion vector size. The predicted point is computed in the same way, except that it is limited by the coding standard limitation that limits motion vector size. As a result, the desired search starting point and the predicted point are different when the limit on motion vector size causes a reduction in the size of a motion vector used to compute the predicted point.

In the implementation, the pre-calculated starting points are stored in a table that, given the distance computed in the first step, provides a start index for the first block in the shifted search order. In the example shown above, the start index is a number selected from 1 to 48, where each index corresponds to a search point in a spiral search order.

The definition of the table in the implementation can be expressed as:

New Start Index=F(d);

where d is the distance calculated in step 1;

Given a distance d, the function F(d) returns an index y, such that for each index i, where i>y, the distance between the spiral search center $P_0$ and the coordinates $P_i$ of the search location for index i is always greater than or equal to (d−1); and for each index i, where i<y, the distance between $P_i$ and $P_0$ is always less than or equal to (d−1).

Expressed another way, the table is defined as:

F(d)=y; for i>y, Distance($P_0$, $P_i$)≧(d−1); and for i<y, Distance($P_0$, $P_i$)<(d−1).

This new search order will search the points closest to the desired starting point earlier than the original order. This alternative approach avoids the additional processing overhead of sorting the search order by distance from the desired starting point, when this point is different than the predicted point.

The encoder implementation uses the combined search criteria (e.g., the modified SAD) in conjunction with a spiral search to enhance the speed of the motion estimation process. One attribute of the CSC is that it allows the block matching process to terminate the search without reaching the end of the search path. This attribute results from the following features of the search process:

1) the CSC incorporates the size of the motion vector; and 2) the spiral search path increases the size of the motion vector with each step.

To illustrate this feature, consider the following expression for the CSC:

$$\text{COMBINED\_MEASURE} = A * \text{Bits(motion vector)} + \text{SD}.$$

As the number of steps away from the spiral center increases, the number of bits used to encode the motion vector also increases.

The minimum value for the CSC at each step is:

CSCmin=A*Bits(motion vector).

This results where the value of SD is zero. Due to the fact that the bits needed to encode the motion vector increases with each step in the spiral search path, the minimum value of CSC also increases at each step:

CSCmin(i+1)≧CSC(i), where i is the step in the spiral search path.

In view of the attributes of the spiral search outlined above, the block matching process can terminate the search at the point where the current CSCmin is greater than or equal to the minimum CSC found up to that point (CSCstored). In particular, if the CSCmin for a point s exists such that;

CSCmin(s)≧CSCstored, then for all i greater then s in the search path:

CSC(i)≧CSCmin(s)≧CSCstored for all i>s.

The variable CSCstored is the minimum value for CSC for any of the search points visited so far in the spiral search path. To take advantage of this feature, the encoder implementation keeps track of the minimum value for CSC found so far and compares it with CSCmin for the current step. If CSCmin for the current search point is greater or equal to CSCstored, then it terminates the search and uses the search point that resulted in the minimum CSC value.

Figure 7:
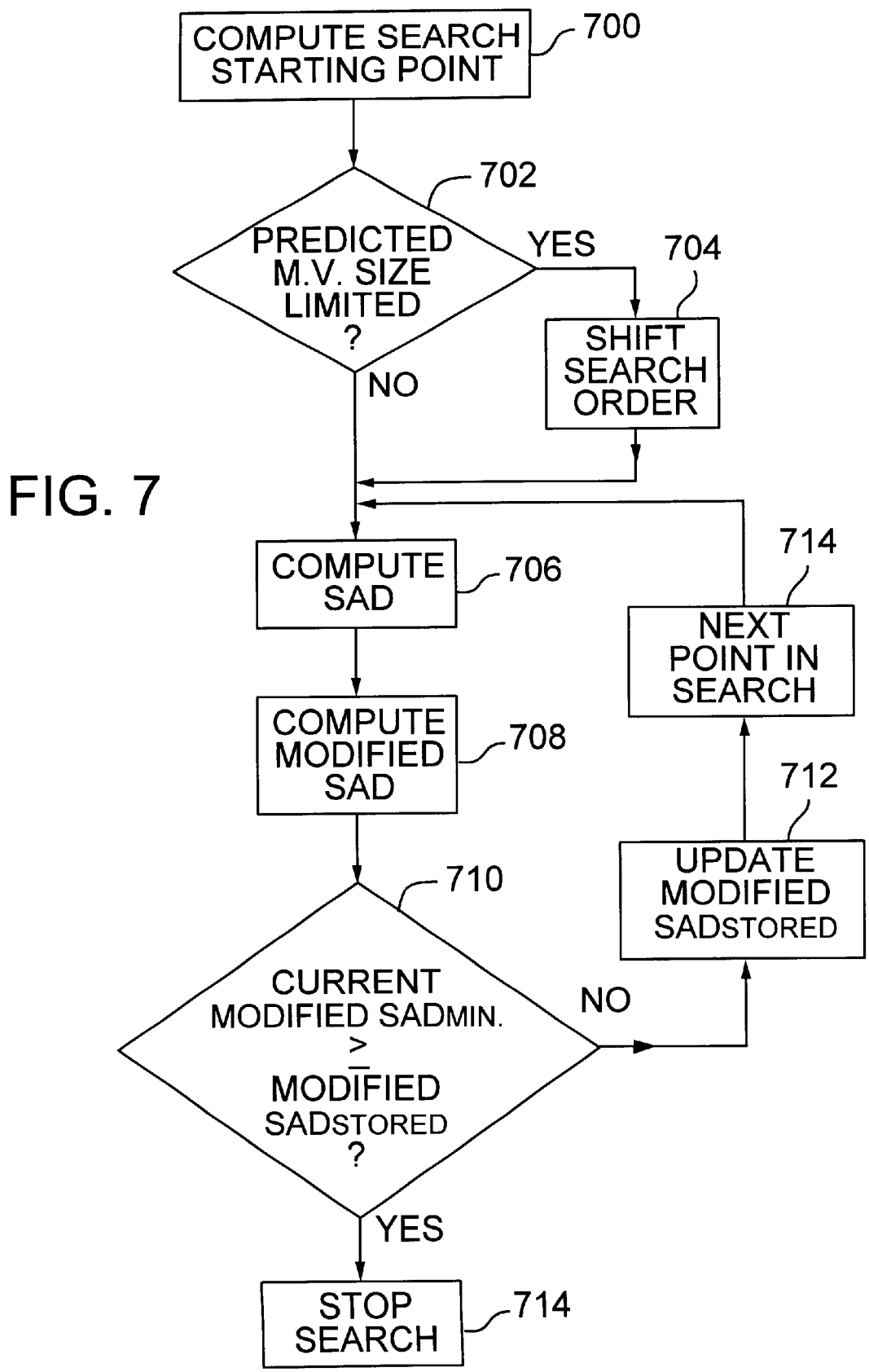
FIG. 7 is a flow diagram illustrating the operation of encoder implementation that uses a combined measure of motion vector and error signal data as the search criteria in its block matching process.

FIG. 7 is a flow diagram illustrating the operation of the encoder implementation. This diagram incorporates the features described above for improving coding efficiency and encoding speed. As shown in FIG. 7, the encoder begins by computing the search starting point (step 700). In this step, the encoder computes the motion vector predictor from the motion vectors of neighboring blocks as explained above. If the predicted motion vector is limited due to the limits on the motion vector size in the MPEG 4 coding standard (decision step 702), then the encoder shifts the search order. Specifically, the encoder shifts the search order so that that target blocks located closer to the actual predicted point are evaluated sooner (Step 704) than blocks located near the location of the predicted point resulting from the limitation on motion vector size.

Next, the encoder begins the block matching process following the search order determined in step 704. For each target block along the search path, the encoder computes the sum of absolute differences (SAD) between the sample values in the source block and the target block (step 706). It then computes a measure of the combined motion vector and error signal data, called the modified SAD (step 708). In the implementation, this quantity is called the modified SAD and is a combination of a minimum modified SAD and the SAD for the current block, where the minimum modified SAD for a block is computed as:

modified SADmin=K*Qs*Bits(motion vector) such that
modified SAD=modified SADmin+SAD.

Figure 8:
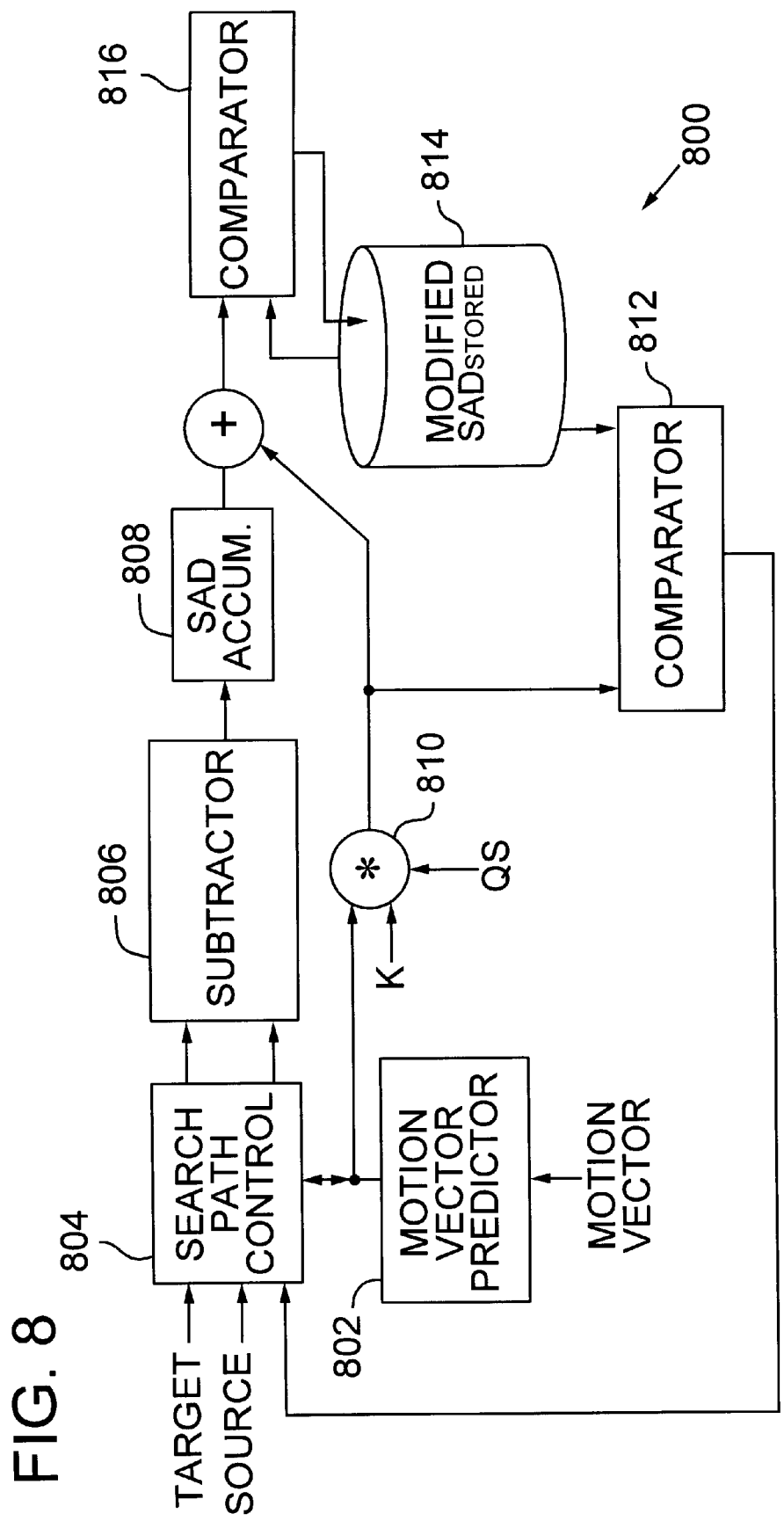
FIG. 8 is a diagram of a motion estimator that uses a modified sum of differences calculation as the search criteria in its block matching process.

The computation of the modified SAD is illustrated in more detail in FIG. 8.

In applications where the SAD is small (e.g., low motion scenes), the search can be terminated if the minimum modified SAD for the current block is greater or equal to the stored value of the modified SAD. To determine whether to continue the search, the encoder compares the current minimum modified SAD for the current target block with a stored value of the modified SAD (step 710). If the current modified SADmin is less than the minimum SAD found so far the encoder updates the stored value of the modified SAD (step 712) and proceeds to the next point in the search path (step 714). Initially, the stored value of the modified SAD is set to the modified SAD of the first block in the search. At subsequent target blocks in the search path, the stored value of the modified SAD is set to the current modified SAD if the current modified SAD is less than the previously stored value. As shown in FIG. 7, the search stops if the minimum modified SAD for the current block is greater than or equal to the lowest value of the modified SAD found so far.

FIG. 8 is a block diagram an implementation of a motion estimator 800 that employs the method shown in FIG. 7. The motion vector predictor 802 represents the calculation of the predicted motion vector. It takes the motion vectors of neighboring blocks and computes a predicted motion vector for the current block. The search path control 804 uses the predicted motion vector to determine the starting point of the search for a matching block in a search area of the target frame. The inputs to the search path control, TARGET and SOURCE, are the target and source images. For each source block in the source image, the search path control computes the search starting location in the target image, and the search order and location of target blocks in the target image. The search order follows a spiral path from the point identified by the predicted motion vector. If the size of the predicted motion vector is limited due to the limitation on the size of the motion vectors, then the search path control selects a shifted search order as described above.

The subtractor 806 computes the differences between pixel values in the source block and the current target block, as dictated by the search path. The SAD accumulator 808 sums the differences and accumulates the sum for the current block.

The motion estimator evaluates the overhead attributable to the motion vector bits based on the motion vector for the current position in the search path. Each step in the search has a motion vector associated with it. Knowing the size of this motion vector, the motion estimator can then calculate the number of bits attributed to the motion vector for the current step. It then adjusts the motion vector overhead (e.g., the bits needed to code the motion vector) by a constant K and the quantization step Qs. Multiplier 810 computes the minimum modified SAD for the current step as Bits(motion vector)*K*Qs.

The minimum value for the modified SAD for the current block (modified SADmin) can then be used to determine whether to continue the search further as explained above. In particular, a comparator 812 compares the modified SADmin for the current block with the stored value of the modified SAD. If modified SADmin is greater or equal to the stored value, then the motion estimator can halt the search and use the target block with the minimum SAD to compute the motion vector for the current macroblock. If not, then the search proceeds to the next search point in the search order.

The motion estimator computes the modified SAD for each target block as the sum of the minimum modified SAD (K*Qs*Bits(motion vector)) and the SAD for the current block. The motion estimator then keeps track of the lowest modified SAD found so far (modified SADstored) along with the motion vector for the target block that yielded this lowest value. The second comparator 816 shown in FIG. 8 represents the process of updating the lowest modified SAD value found in the search after each target block is evaluated. When the search terminates, the motion vector associated with the target block having the lowest modified SAD value is encoded for the macroblock.

Brief Overview of a Computer System

Figure 9:
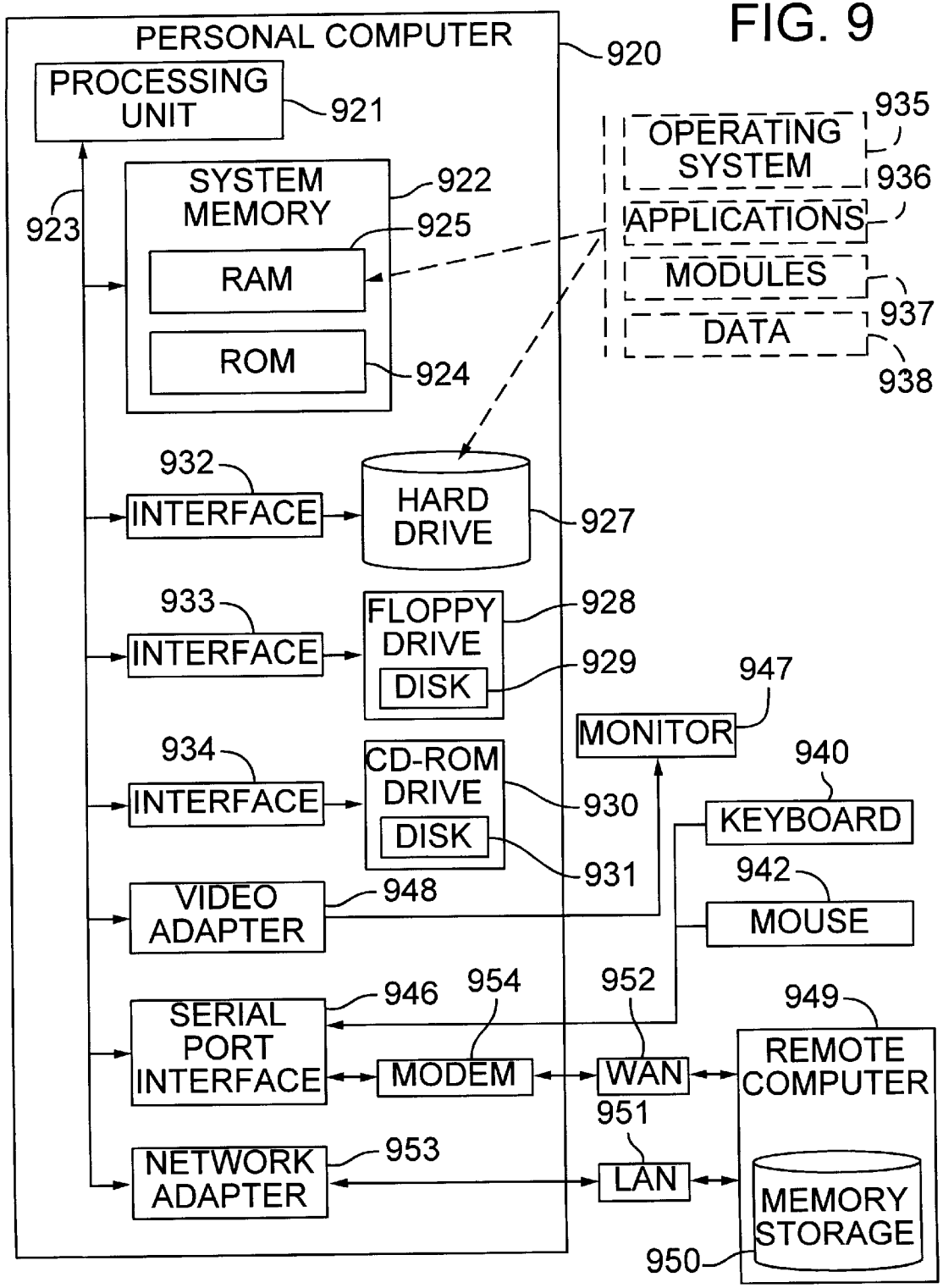
FIG. 9 is a block diagram of a computer system that serves as an operating environment for a software implementation of the invention.

FIG. 9 and the following discussion are intended to provide a brief, general description of a suitable computing environment in which the invention may be implemented. Although the invention or aspects of it may be implemented in a hardware device, the encoder and decoder described above are implemented in computer-executable instructions organized in program modules. The program modules include the routines, programs, objects, components, and data structures that perform the tasks and implement the data types described above.

While FIG. 9 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 9 illustrates an example of a computer system that serves as an operating environment for the invention. The computer system includes a personal computer 920, including a processing unit 921, a system memory 922, and a system bus 923 that interconnects various system components including the system memory to the processing unit 921. The system bus may comprise any of several types of bus structures including a memory bus or: memory controller, a peripheral bus, and a local bus using a bus architecture such as PCI, VESA, Microchannel (MCA), ISA and EISA, to name a few. The system memory includes read only memory (ROM) 924 and random access memory (RAM) 925. A basic input/output system 926 (BIOS), containing the basic routines that help to transfer information between elements within the personal computer 920, such as during start-up, is stored in ROM 924. The personal computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical diskdrive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions (program code such as dynamic link libraries, and executable files), etc. for the personal computer 920. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 925, including an operating system 935, one or more application programs 936, other program modules 937, and program data 938. A user may enter commands and information into the personal computer 920 through a keyboard 940 and pointing device, such as a mouse 942. Other input devices (not shown) may include a microphone, joystick, game pad, satellite dish, scanner, or the like. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a display controller or video adapter 948. In addition to the monitor, personal computers typically include other peripheral output devices (not shown), such as speakers and printers.

The personal computer 920 may operate in a networked environment using logical connections to one or more remote computers, such as a remote computer 949. The remote computer 949 may be a server, a router, a peer device or other common network node, and typically includes many or all of the elements described relative to the personal computer 920, although only a memory storage device 950 has been illustrated in FIG. 9. The logical connections depicted in FIG. 9 include a local area network (LAN) 951 and a wide area network (WAN) 952. Such networking environments are commonplace in offices, enterprise-wide computer networks, intranets and the Internet.

When used in a LAN networking environment, the personal computer 920 is connected to the local network 951 through a network interface or adapter 953. When used in a WAN networking environment, the personal computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the personal computer 920, or portions thereof, may be stored in the remote memory storage device. The network connections shown are merely examples and other means of establishing a communications link between the computers may be used.

CONCLUSION

While the invention has been illustrated using a specific implementation as an example, the scope of the invention is not limited to the specific implementation described above. For example, the implementation described above computes a measure of the combined motion vector and error signals for a macroblock using a specific formula that weights the bits used to encode the motion vector. However, the way in which the overhead of the motion vector and error signal is measured may vary with the implementation.

While the spiral search path described above has advantages for increasing the encoder speed, it is not necessary to use this approach in all implementations of the invention. Similarly, the approach of shifting the search order may only apply in cases where the limitations on motion vector size lead to a less than optimal starting location for the block matching search. However, there are advantages to selecting a search path and/or shifting the search order to search blocks that are more likely to have a lower combined motion vector and error signal overhead.

In view of the many possible implementations of the invention, it should be recognized that the implementation described above is only examples of the invention and should not be taken as a limitation on the scope of the invention. Rather, the scope of the invention is defined by the following claims. We therefore claim as our invention all that comes within the scope and spirit of these claims.

We claim:

1. A method for performing motion estimation in video coding applications, the method comprising:
   a) for a selected location of a source block in a source frame, finding a starting location to begin a search for a matching block among target blocks in a target frame;
   b) computing a difference between pixel values at pixel locations in the source block from the source frame and pixel values at corresponding pixel locations in a target block in the target frame located at the starting location;
   c) computing a measure of combined motion and error signal data for the target block at the starting location;
   d) repeating steps b and c for subsequent target blocks in the search along a spiral path in the target frame and maintaining a minimum measure of the combined motion and error signal data; and
   e) for each of the subsequent target blocks in the search, computing a measure of the coding overhead for motion data associated with the target block and comparing the measure of the coding overhead with the minimum measure of the combined motion and error signal data to determine whether to terminate the search for the matching block.

2. The method of claim 1 wherein e) comprises:
   when the coding overhead is greater than the minimum measure of combined motion and error signal data, selecting a motion vector of the target block associated with the minimum measure as the motion vector used to encode the source block.

3. The method of claim 1 wherein the measure of the combined motion and error signal data includes a measure of bits needed to encode a motion vector associated with a target block.

4. The method of claim 3 wherein the measure of the combined motion and error signal data is expressed as:

$$K*Qs*Bits \text{ (motion vector)}+SAD,$$

where K is a constant selected for a video sequence being coded;

QS is a quantization step;

Bits (motion vector) is the measure of bits needed to encode the motion vector; and SAD represents the error signal as a sum of absolute differences between pixel values in the source block and corresponding pixel values in a target block in the target frame at a location along the spiral search path.

5. The method of claim 1 wherein the starting location is computed from previously computed motion vectors of neighboring blocks of the source block in the source frame.

6. The method of claim 1 wherein the spiral search path comprises an ordered sequence of block locations in the target frame, where subsequent block locations after the starting location are at increasing distances from the starting location.

7. The method of claim 1 further including:

predicting the starting location from at least one motion vector of a neighboring block to the source block in the source frame;

when the predicted starting location is not limited by a maximum motion vector size, using a first spiral search path; and when the predicted starting location is limited by a maximum motion vector size, using a shifted search order of the first spiral search path.

8. The method of claim 1 further including:

repeating a–e for source blocks overlapping an arbitrary shaped object segmented from the source frame.

9. The method of claim 1 further including:

repeating a–e for source blocks in the source frame.

10. A computer readable medium having instructions for performing the method of claim 1.

11. A motion estimator for performing a block matching search in a video coder, the motion estimator comprising:

a subtractor for computing differences between pixel values in a source block of a source frame and a target block of a target frame;

a sum of differences accumulator in communication with the subtractor for accumulating a sum of the differences from the subtractor;

an adder in communication with the SAD accumulator for adding a sum of the differences with a measure of motion vector overhead for the block to compute a combined measure of motion vector and error signal data for the target block, wherein a quantization factor weights the measure of motion vector overhead; and a comparator for comparing the combined measure of motion vector and error signal data with a previously computed combined measure of motion vector and error signal data for another target block to find a target block in the target frame with a minimum combined measure of motion vector and error signal data.

12. The motion estimator of claim 11 further including a search path control for controlling a sequence of target blocks input to the subtractor such that the sequence forms a spiral search path in the target frame.

13. The motion estimator of claim 12 wherein the search path control selects a first search sequence of target blocks when a predicted motion vector for the source block is altered by a limitation on motion vector size and selects a second search sequence when the predicted motion vector is not altered by the limitation on motion vector size.

14. The motion estimator of claim 11 further including a motion vector predictor for predicting a starting location for the search based on at least one motion vector computed for a neighboring block to the source block in the source frame.

15. The motion estimator of claim 11 further including:

a comparator in communication with a search path control for terminating the search when a measure of motion vector coding overhead exceeds a combined measure of motion and error signal data for a target block evaluated previously in the search path.

16. The motion estimator of claim 15 wherein the search path control provides a sequence of target blocks input to the subtractor such that the sequence forms a spiral search path in the target frame.

17. A method for performing motion estimation in video coding applications, the method comprising:

for a source block in a source frame, searching for a matching block among target blocks in a target frame, including:

computing a difference between pixel values at pixel locations in the source block from the source frame and pixel values at corresponding pixel locations in target blocks in the target frame; and computing a measure of combined motion data and error signal data for the target blocks, wherein a quantization factor weights the motion data;

selecting a target block from among the target blocks with a minimum combined measure of motion and error signal data for the target blocks; and using motion data approximating motion between the pixels of the source block and the selected target block to encode the source block.

18. The method of claim 17 wherein the target blocks are located at increasing distances from a starting search point; and computing a measure of coding overhead of a motion vector for each target block; and using the measure of coding overhead of the motion vector to determine whether to terminate the search for the matching block.

19. The method of claim 17 further including:

predicting a motion vector for the source block;

using the motion vector to predict a starting location for the search in the target frame;

selecting a search path of target blocks in the target frame such that target blocks closer to the starting location are evaluated before target blocks located farther from the starting location.

20. A computer readable medium having instructions for performing the method of claim 17.

21. A computer readable medium having stored thereon instructions for performing a method of block matching for motion estimation in a video sequence, the method comprising:

for a source block of a source frame, searching for a matching target block from among plural target blocks of a target frame, wherein for each searched target block the searching includes:

computing a motion vector cost for encoding the searched target block;

weighting the motion vector cost by a quantization factor; and computing a match criterion for the searched target block based at least in part upon the weighted motion vector cost; and selecting the matching target block based upon the respective match criteria for the searched target blocks.

22. The computer readable medium of claim 21 wherein the match criterion for each searched target block is also based at least in part upon an error measure between the searched target block and the source block.

23. The computer readable medium of claim 21 wherein for each searched target block the searching further includes:
   weighting the motion vector cost by a constant, the constant optimized over the video sequence to reduce encoding costs.

24. The computer readable medium of claim 21 wherein a spiral search pattern controls the order in which the plural target blocks are searched.

25. The computer readable medium of claim 24, the method further comprising:
   shuffling the spiral search pattern to adjust for motion vector size limitations.

26. The computer readable medium of claim 24 wherein the match criterion for each searched target block is also based at least in part upon an error measure between the searched target block and the source block, and wherein for each searched target block the searching further includes:
   if the weighted motion vector cost for the searched target block exceeds a best match criterion for previously searched target blocks, terminating the searching.

27. A method for performing motion estimation in video coding applications, the method comprising:
   for a selected location of a source block in a source frame, finding a starting location to begin a search for a matching block among target blocks in a target frame;
   computing a coding overhead measure of combined motion data and error signal data for a target block at the starting location;
   for each of one or more subsequent target blocks in the search, computing a minimum coding overhead measure based upon motion data for the subsequent target block and maintaining a current best coding overhead measure, wherein the search terminates if the minimum coding overhead measure for the subsequent target block exceeds the current best coding overhead measure.

28. A method for performing motion estimation for a source block in a source fame of a sequence of video frames, wherein the motion estimation includes a search for a matching block among target blocks in a target frame of the sequence, and wherein the search starts from a starting location in the target frame, the method comprising:
   computing a combined coding overhead measure for a target block at the so location based upon plural factors, wherein the plural factors include motion data and error signal data for the target block;
   initializing a current best coding overhead measure based upon the combined coding overhead measure computed for the target block at the starting location, wherein the current best coding overhead measure is for a current best match target block among the target blocks in the target frame;
   for each of one or more subsequent target blocks in the target frame,
      computing a simplified coding overhead measure for the subsequent target block based upon less than all of the plural factors, thereby simplifying the computing the simplified coding overhead measure; and
      terminating the search if a comparison of the current best coding overhead measure with the simplified coding overhead measure for the subsequent target block indicates the subsequent target block is necessarily a worse match than the current best match target block.

29. The method of claim 28 further comprising:
   for the each of one or more subsequent target blocks in the target frame,
      if the comparison does not indicate the subsequent target block is necessarily a worse match than the current best match target block, computing the combined coding overhead measure for the subsequent target block.

30. The method of claim 29 further wherein the computing the combined coding overhead measure for the subsequent target block starts from the simplified coding overhead measure for the subsequent target block.

31. The method of claim 29 further comprising:
   for the each of one or more subsequent target blocks in the target frame,
      comparing the combined coding overhead measure for the subsequent target block with the current best coding overhead measure and updating the current best coding overhead measure as necessary.

32. The method of claim 28 wherein the less than all of the plural factors includes motion data for the subsequent block and excludes error signal data for the subsequent block.

33. A video encoder comprising:
   means for searching for a matching block among plural target blocks in a target frame for a source block in a source frame, including means for computing a measure of combined cost of motion data and error signal data for one or more of the plural target blocks in the target frame, wherein the means for searching stops the searching if a measure of cost of motion data for a current target block exceeds a best measure of combined cost of motion data and error signal data among previous target blocks in the target frame, and wherein the means for searching selects the matching block from among the plural target blocks in the target frame based upon the best measure after the searching stops; and
   means for encoding the source block based at least in part upon matching block motion data.

* * * * *

UNITED STATES PATENT AND TRADEMARK OFFICE
CERTIFICATE OF CORRECTION

PATENT NO.   : 6,418,166 B1
DATED        : July 9, 2002
INVENTOR(S)  : Wu et al.

It is certified that error appears in the above-identified patent and that said Letters Patent is hereby corrected as shown below:

<u>Title page,</u>
Item [56], References Cited, insert the following references:
-- U.S. PATENT DOCUMENTS

| | | |
|---|---|---|
| 4,727,422 | 02/1988 | Hinman |
| 4,802,005 | 01/1989 | Kondo |
| 4,838,685 | 06/1989 | Martinez et al. |
| 4,999,705 | 03/1991 | Puri |
| 5,067,014 | 11/1991 | Bergen et al. |
| 5,103,305 | 04/1992 | Watanabe |
| 5,214,504 | 05/1993 | Toriu et al. |
| 5,251,030 | 10/1993 | Tanaka |
| 5,274,453 | 12/1993 | Maeda |
| 5,376,971 | 12/1994 | Kadono et al. |
| 5,469,226 | 11/1995 | David et al. |
| 5,477,272 | 12/1995 | Zhang et al. |
| 5,546,129 | 08/1996 | Lee |
| 5,557,684 | 09/1996 | Wang et al. |
| 5,572,258 | 11/1996 | Yokoyama |
| 5,581,308 | 12/1996 | Lee |
| 5,594,504 | 01/1997 | Ebrahimi |
| 5,598,215 | 01/1997 | Watanabe |
| 5,598,216 | 01/1997 | Lee |
| 5,612,743 | 03/1997 | Lee |
| 5,617,144 | 04/1997 | Lee |
| 5,619,281 | 04/1997 | Jung |
| 5,627,591 | 05/1997 | Lee |
| 5,642,166 | 06/1997 | Shin et al. |
| 5,654,771 | 08/1997 | Tekalp et al. |
| 5,668,608 | 09/1997 | Lee |
| 5,673,339 | 09/1997 | Lee |
| 5,689,306 | 11/1997 | Jung |
| 5,692,063 | 01/1996 | Lee |
| 5,717,463 | 02/1998 | Brailean et al. |
| 5,731,849 | 03/1988 | Kondo et al. |
| 5,734,737 | 03/1998 | Chang et al. |
| 5,784,175 | 10/1995 | Lee |
| 5,802,220 | 09/1998 | Black et al. |
| 5,870,148 | 02/1999 | Lillevold |
| 5,880,784 | 03/1999 | Lillevold |
| 5,946,043 | 12/1997 | Lee et al. |

UNITED STATES PATENT AND TRADEMARK OFFICE
CERTIFICATE OF CORRECTION

PATENT NO. : 6,418,166 B1
DATED : July 9, 2002
INVENTOR(S) : Wu et al.

It is certified that error appears in the above-identified patent and that said Letters Patent is hereby corrected as shown below:

Title page (cont'd),

| | | |
|---|---|---|
| 5,959,673 | 10/1995 | Lee et al. |
| 5,970,173 | 10/1995 | Lee et al. |
| 5,982,438 | 03/1996 | Lin et al. |
| 6,005,625 | 12/1999 | Yokoyama |
| 6,037,988 | 03/2000 | Gu et al. |

FOREIGN PATENT DOCUMENTS

| | |
|---|---|
| EP 0395293 A1 | Europe |
| EP 0497586 A2 | Europe |
| EP 0579319 A2 | Europe |
| EP 0614318 A2 A3 | Europe |
| EP 0625853 A2 A3 | Europe |
| WO 91/11782 | PCT International |
| WO 97/05746 | PCT International |

OTHER PUBLICATIONS

Brady et al., "Object Detection and Tracking Using An Em-Based Motion Estimation and Segmentation Framework," ICIP '96, vol. 1, pp. 925-928, Lausanne, Switzerland (Sept. 1996)

Brady et al., "Computationally Efficient Estimation of Polynomial Model-based Motion," Proceedings of Picture Coding Symposium 1996, Melbourne (Mar. 1996)

Gibson et al., Digital Compression of Multimedia, "Multimedia Conferencing Standards," Chapter 10, pp. 309-62 (1998)

Gibson et al., Digital Compression of Multimedia, "MPEG Compression," Chapter 11, pp. 363-418 (1998)

UNITED STATES PATENT AND TRADEMARK OFFICE
CERTIFICATE OF CORRECTION

PATENT NO. : 6,418,166 B1
DATED : July 9, 2002
INVENTOR(S) : Wu et al.

It is certified that error appears in the above-identified patent and that said Letters Patent is hereby corrected as shown below:

Title page (cont'd),

Gu, Chuang, "3D Contour Image Coding Based on Morphological Filters and Motion Estimation," ICASSP94, pp. 277-280 (1994)

Gu et al., "Combined Gray-Level and Motion Segmentation for Very Low Bit-Rate Coding," SPIE, vol. 2451, pp. 121-29 (Mar. 1995)

Gu, C. et al., "Semantic Video Object Tracking Using Region-Based Classification," Proc. of IPCIP'98 Int'l Conference on Image Processing, Chicago, Il, pp. 643-47 (Oct. 1998)

Hotter, "Optimization and Efficiency of an Object-Oriented Analysis-Syntheis Coder," IEEE Transactions on Circuits and Systems for Video Technology," 2:181-194 (Apr. 1994)

International Organization for Standardisation ISO/IEC JTCI/SC29/WG11, N2459 "Overview of the MPEG-4 Standards," (Oct. 1998)

ITU-T, "ITU-T Recommendation H.263 Video Coding for Low Bit Rate Communication," (Feb. 1998)

Le Gall, "MPEG: A Video Compression Standard for Multimedia Applications," Communications of the ACM, vol. 34, No. 4, pp. 47-58 (Apr. 1991)

Lee et al., "A Layered Video Object Coding System Using Sprite and Affine Motion Model, IEEE Transactions on Circuits and Systems for Video Technology," vol. 7, No. 1, pp. 130-145 (Feb. 1997)

Orchard, "Predictive Motion-Field Segmentation for Image Sequence Coding, IEEE Transactions on Circuits and Systems for Video Technology," vol. 3, No. 1, pp. 54-70 (Feb. 1993)

Rui et al., "Digital Image/Video Library and MPEG-7: Standardization and Research Issues," ICASSP '98

Salembier et al., "Region-based Video Coding Using Mathematical Morphology," Proceedings of the IEEE, vol. 83, No. 6, pp. 843-57 (Jun. 1995)

Salembier et al., "Segmentation-Based Video Coding System Allowing the Manipulation of Objects," IEEE Transactions on Circuits and Systems for video Technology, vol. 7, No. 1, pp. 60-73 (Feb. 1997)

Sanson, "Motion Affine Models Identification and Application to Television Image Coding," Visual Communications and Image Processing '91: Visual Communications, 1605:570-581 (Nov. 1991)

Seferidis et al., "General Approach to Block-Matching Motion Estimation," Optical Engineering, vol. 32, No. 7, pp. 1464-1474 (Jul. 1993)

Zakhor et al., "Edge-Based 3-D Camera Motion Estimation with Application to Video Coding," IEEE Transactions on Image Processing, 2:481-498 (Feb. 1993) --

UNITED STATES PATENT AND TRADEMARK OFFICE
CERTIFICATE OF CORRECTION

PATENT NO. : 6,418,166 B1
DATED : July 9, 2002
INVENTOR(S) : Wu et al.

It is certified that error appears in the above-identified patent and that said Letters Patent is hereby corrected as shown below:

Column 2,
Line 56, "for variety" should read -- for a variety --.

Column 3,
Lines 8-9, "segmentedimage" should read -- segmented image --.

Column 4,
Line 31, "FIG. 5 is diagram" should read -- FIG. 5 is a diagram --.

Column 8,
Line 55, "left block 40" should read -- left block 410 --.

Column 10,
Line 54, "greater then $s$" should read -- greater than $s$ --.

Column 11,
Line 7, "so that that" should read -- so that --.
Line 45, "diagram an" should read -- diagram of an --.

Column 15,
Line 1, "QS" should read -- Qs --.

Column 17,
Line 47, "at the so location" should read -- at the starting location --.

Signed and Sealed this

Fourteenth Day of September, 2004

JON W. DUDAS
*Director of the United States Patent and Trademark Office*